Figure 1:
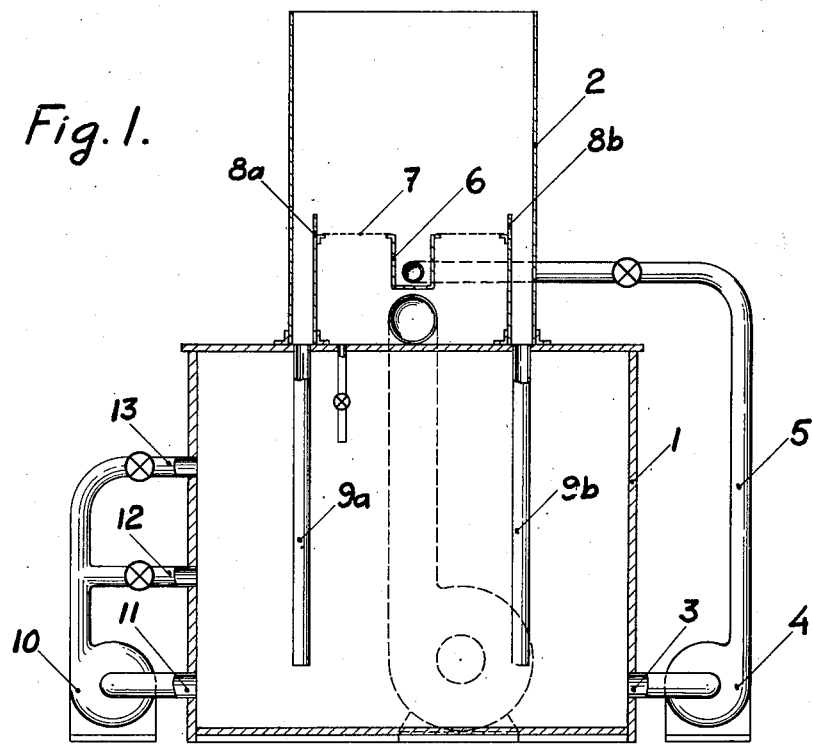

April 20, 1937. K. A. WESSBLAD ET AL 2,077,652

APPARATUS FOR THE FERMENTATION OF LIQUIDS

Filed Jan. 28, 1933

INVENTORS
Karl Alexander Wessblad
Johan Olof Naucler
Hans Elis Abraham Göth
BY Wm T. Hedlund
their ATTORNEY Patented Apr. 20, 1937

2,077,652

UNITED STATES PATENT OFFICE 2,077,652

APPARATUS FOR THE FERMENTATION OF LIQUIDS

Karl Alexander Wessblad, Hans Elis Abraham Göth, and Johan Olof Naucler, Stockholm, Sweden, assignors to Industrikemiska Aktiebolaget, Stockholm, Sweden, a joint-stock company of Sweden Application January 28, 1933, Serial No. 654,016
In Sweden January 30, 1932

4 Claims. (Cl. 261—113)

The present invention relates to apparatus for carrying out fermentation processes or the like in which the solution, in which fermentation is to be excited, is treated with air or some other oxygen-containing gas or gas mixture.

In known aeration processes, e. g. of wort solutions in fermentation vessels, as they have been usually carried on in the past, the air or oxygen-containing gas is forced through the fermenting liquid as it lies contained in the fermentation vessel, and the pressure under which the air or gas has to be introduced is comparatively high as a rule, on account of the resistance of the relatively great depth of this body of liquid. This pressure often amounts to 0.3 or 0.4 atmosphere. In consequence thereof the power consumption for the aeration process is considerable. Furthermore, through this aeration the wort solution very often starts foaming so violently that special foam killers must be employed to keep the foaming within reasonable limits. The use of foam killers, generally low grade mineral oils or waste fats, which are practically fully consumed and not recoverable, makes the manufacture of yeast expensive, not only because the foam-killing materials represent a big expense in themselves, but also because they increase the infection risk in the fermentation vessels.

The primary object of the invention is therefore to provide a novel apparatus for treating fermenting liquids such as wort solutions, mashes or the like, with air or other gases in such a way that the power consumption for this treatment is considerably decreased and that very little or no addition of foam killers becomes necessary. The reduction in power consumption is attained both by aerating only a small portion of the main body of liquid at any one time and by minimizing as far as possible the emulsification of the liquid by withdrawing from the aerating apparatus independently of the aerated liquid all of the air or gas passed through the liquid except the relatively small quantity of oxygen which is taken up by the liquid during aeration.

The functioning of the apparatus of the invention may be summarized as follows: the fermenting liquid or solution which is to be aerated is caused to flow from a fermentation vessel over an aerating device, such as a strainer plate or perforated pipes, and back to the fermentation vessel or to some other convenient reservoir. Air or a suitable gas is forced in finely divided streams into and through the quantity of liquid in the aerating device, and the excess air or gas passing therethrough is led off from said device independently of the liquid so as to prevent its participation in the circulation of the latter. This cycle is repeated as many times during the fermentation process as may be necessary. In accordance with this procedure, only the relatively small quantity of oxygen taken up by the liquid remains therein in emulsified form as small bubbles, the result being that continued circulation of the liquid by a pump or the like until the intended growth of yeast has taken place is materially facilitated because of the minimum amount of emulsion which is formed.

According to the invention, a continuous stream of the liquid to be fermented is passed from the fermentation vessel, through an aerating device and back to the fermentation vessel, the aerating device being provided with an overflow or the like which is constructed in any suitable manner such that the depth of the layer of liquid being aerated may be varied at will but is always materially less than the depth of the main body of the liquid contained in the fermentation vessel. The depth of layer selected will, of course, vary dependent upon the working conditions obtaining at any given time. The aeration device can be arranged anywhere, in relation to the fermentation vessel, but preferably it is disposed above the liquid level in the fermentation vessel, so that the solution running over the aeration device can be brought back to the fermentation vessel or another reservoir by gravity. As even in the present process, the aerated solution generally contains a certain amount of very small emulsified air bubbles, difficulties would arise in pumping the same, and it is therefore more efficient to so arrange the apparatus that the return of the liquid to the fermentation vessel is gravitational.

The nourishment solution or nutrient broth, necessary for the formation and normal growth of the yeast, can be introduced into the fermenting liquid anywhere during the process, but is preferably added either immediately after the aeration or at a point where active mixing takes place in the liquid, e. g. in or immediately before the point where the pump line supplying the liquid enters the aeration device, or at the point where the pump draws the liquid out of the fermentation vessel for delivery to the aerating device.

The nature of the invention and still further objects thereof are more fully disclosed in the following description which is to be considered in conjunction with the accompanying drawing, the latter illustrating diagrammatically, and by way of example only, one embodiment of apparatus for carrying the invention into practical effect.

Figure 2:
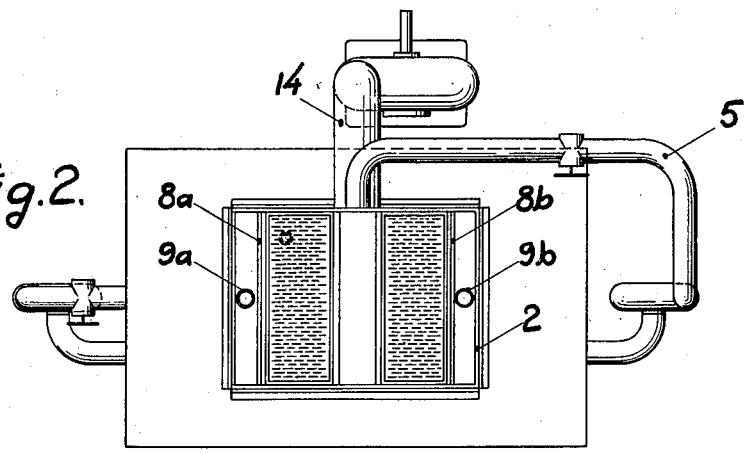

In this drawing, Fig. 1 is a diagrammatic elevation view, partly in section, of one form of apparatus embodying the invention and adapted to be operated in accordance with the procedure described above, and Fig. 2 is a top view of the apparatus of Fig. 1, the reference numerals in Fig. 2 corresponding with those used in Fig. 1.

Referring now to the drawing, 1 is a reservoir containing wort solution, mash or the like, which may generally correspond to a usual fermentation vessel, and 2 is a vessel provided with a perforated false bottom or plate and serving as the aeration device. The wort solution in vessel 1 is supplied by pump 4 through pipes 3 and 5 to a distribution channel 6 in aerating vessel 2. From channel 6 the liquid runs over the strainer plate 7 to the outlet pipes 8a and 8b on both sides, said pipes being constructed or arranged in any suitable manner such that the depth of the layer of liquid above plate 7 can be regulated as desired, although always maintained at only a fraction of the depth of the main body of liquid in fermentation vessel 1. Through these pipes 8a and 8b the liquid passes to pipes 9a or 9b, respectively, and returns to the fermentation vessel 1. A small, valve-controlled pipe in the bottom of vessel 2 (shown best in Fig. 1) enables liquid that has dripped through the plate or screen 7 to be returned to vessel 1. The aeration apparatus 2 is provided with an intake pipe 14 for air which is distributed under and forced to pass through the strainer plate 7 and the layer of liquid on the top of it, the pressure of the air thus supplied being relatively low as compared with that required in prior fermentation devices of this general character because of the relative shallowness of the layer of liquid maintained above plate 7. For this purpose a fan may be combined with apparatus 2 in such a manner that the air is sucked or pressed through the strainer plate and the liquid layer, and passes out through the open top of vessel 2 as shown, thus not participating in the circulation of the aerated liquid. The fermentation vessel 1 may also be provided with a device for stirring the wort solution and keping it in constant motion, e. g. consisting of a pump 10 with intake pipe 11 and outlet pipes 12 and 13.

As pointed out above, the thickness of the solution layer on the strainer plate 7 is relatively small, especially as compared to the depth of the liquid in fermentation vessel 1, and can be fixed and regulated at discretion by a suitable arrangement of the overflow device. Therefore, only a small portion of the fermenting liquid is being aerated at any one time.

It is a further object of the invention to combine to the best effect the height or thickness of the solution layer and the area of the air openings of the aeration device by which the air is put into a finely divided condition so that foam generation is fairly limited, and power consumption considerably reduced in comparison with former methods. It has been found that efficient operation can be secured if the area of the respective holes of a strainer plate or a perforated pipe is 0.8 square millimeter or larger which, in the case of circular holes, is equivalent to a diameter of at least about 1 millimeter. Instead of a strainer plate a slotted plate or pipe may be employed, and in such a case the width of the slots should be larger than 0.5 millimeter. The depth or thickness of the liquid layer above the plate may be kept best at 10 centimeters or less. In this way a power saving of from 50 to 90 per cent can be attained as compared with the present power consumption for such processes.

What is claimed is:—

1. Apparatus for the fermentation of liquids comprising a vessel for containing the main body of fermenting liquid, an aerating device mounted above the level of the liquid in said vessel, means for supplying liquid from said vessel to said device, means in said device for forming the liquid supplied from said vessel into a relatively thin layer of a depth materially less than the normal depth of the main body of liquid in said vessel, means for supplying an oxygen-containing gas to said device under pressure, means for dividing the supplied gas and directing it into and through said layer in a plurality of relatively fine streams for aerating said liquid, means for returning the aerated liquid from said device to said vessel by gravity, and means for leading the gas passing through the liquid layer off from said device independently of said liquid.

2. Apparatus for the fermentation of liquids comprising a vessel for containing the main body of fermenting liquid, an aerating device mounted above the level of the liquid in said vessel, means for supplying liquid from said vessel to said device, a perforated plate in said device, means for flowing the liquid supplied from said vessel across said plate in a layer of variable depth, said depth always being maintained materially less than the normal depth of the main body of liquid in said vessel, means for supplying air to said device beneath said plate under sufficient pressure to force the same through the perforations therein and through the liquid layer thereon, thereby aerating said liquid, and means for returning the aerated liquid of said layer from said device to said vessel by gravity, said device being provided with an escape for the air passing through the liquid layer such that said air does not participate in the further circulation of the liquid.

3. Apparatus for the fermentation of liquids comprising a vessel for containing the main body of fermenting liquid, an aerating device mounted above the level of the liquid in said vessel, means for supplying liquid from said vessel to said device, means in said device for forming the liquid supplied from said vessel into a relatively thin layer of a depth materially less than the normal depth of the main body of liquid in said vessel, means for supplying an oxygen-containing gas to said device under pressure, means for dividing the supplied gas and directing it into and through said layer in a plurality of relatively fine streams for aerating said liquid, means for returning the aerated liquid from said device to said vessel by gravity, means for leading the gas passing through the liquid layer off from said device independently of said liquid, and means for stirring the main body of liquid in said vessel independently of the circulation induced by the supply to and return from said aerating device.

4. Apparatus for the fermentation of liquids comprising a fermentation vessel for containing the main body of fermenting liquid, an aerating vessel mounted above the level of the liquid in said fermentation vessel, a horizontal perforated plate mounted in said aerating vessel, a distributing channel associated with said plate with its bottom below the level of said plate, means for supplying liquid from said fermentation vessel to said channel whence it flows over said plate in a relatively thin layer, means for establishing the depth of said layer upon said plate, means for supplying air to said aerating vessel beneath said plate under sufficient pressure to force the same through the perforations therein and through said liquid layer thereon, thereby aerating the liquid, and means for returning the liquid overflowing from said plate to said fermentation vessel by gravity, said aerating vessel having an opening through which the air passing through said liquid layer escapes without participation in the further circulation of said liquid.

KARL ALEXANDER WESSBLAD.
JOHAN OLOF NAUCLER.
HANS ELIS ABRAHAM GÖTH.